Figure 9:
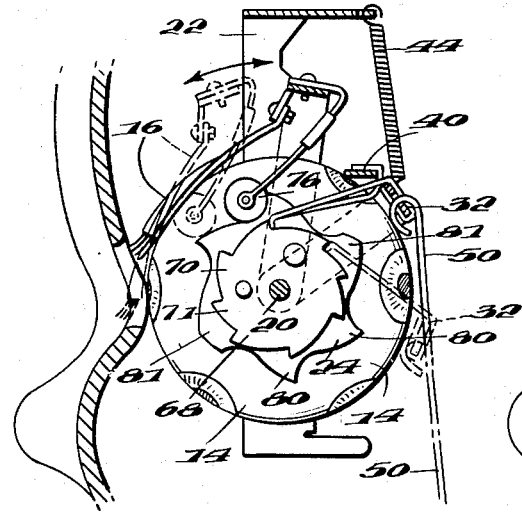

Oct. 4, 1960 W. K. WALSS 2,954,639
DOLL
Filed Feb. 18, 1955 5 Sheets-Sheet 1
Fig. 1.
Fig. 6.
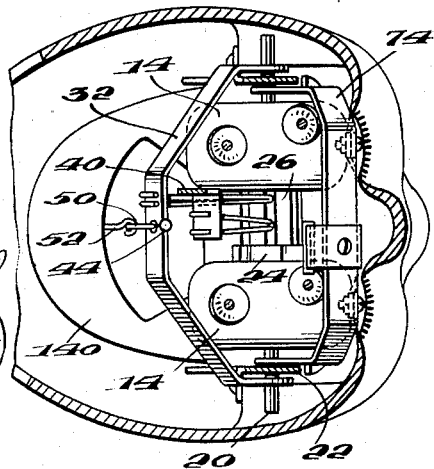
Fig. 7.
Fig. 8.
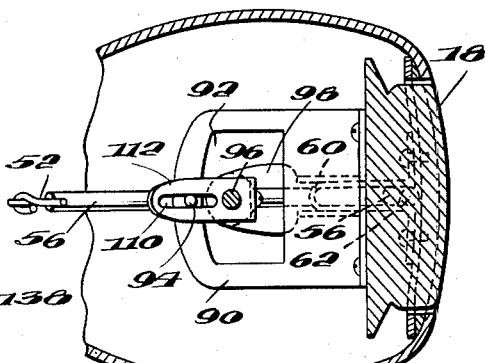
INVENTOR
WALTER K. WALSS,
BY Robert B. Larson
ATTORNEY

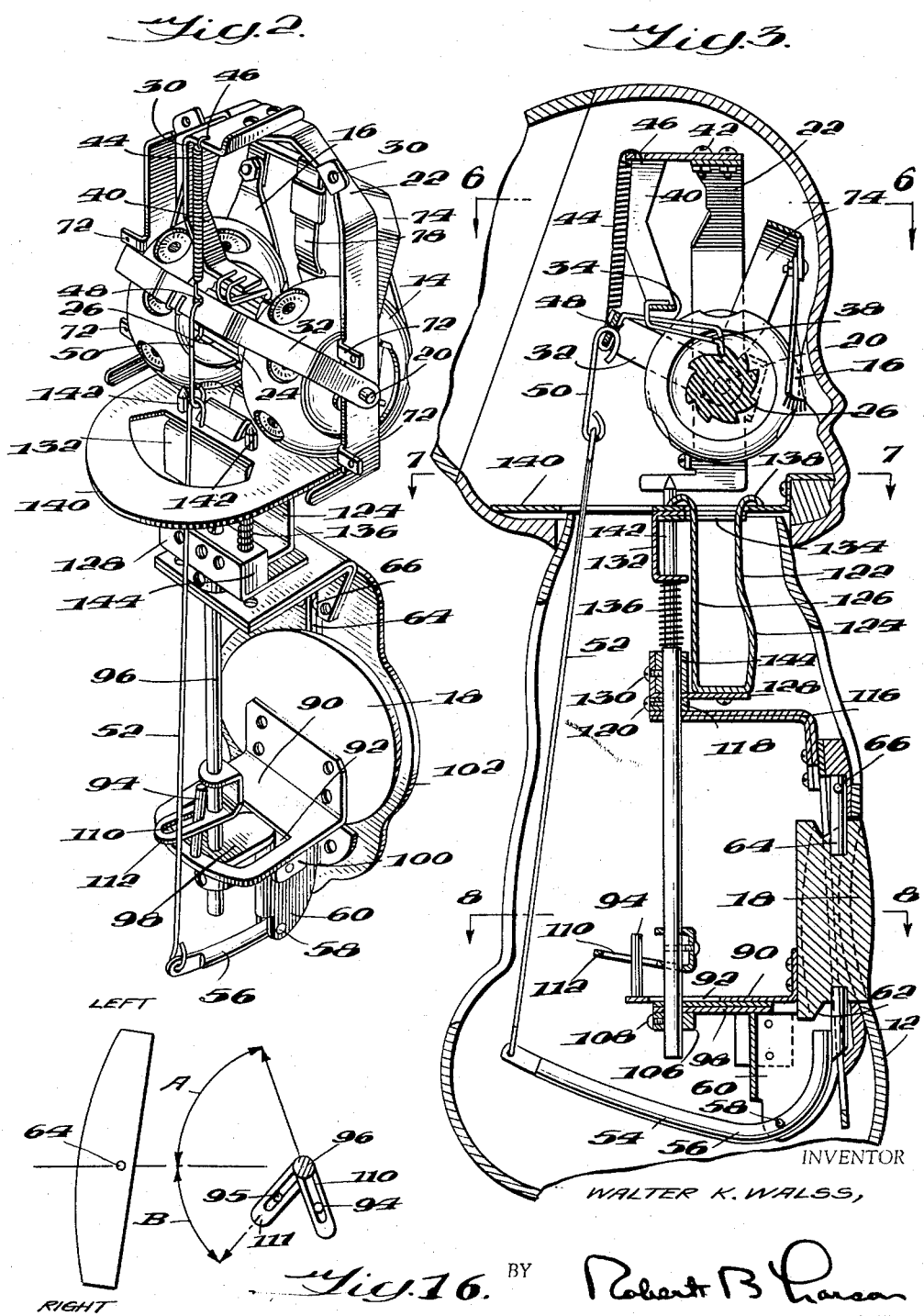

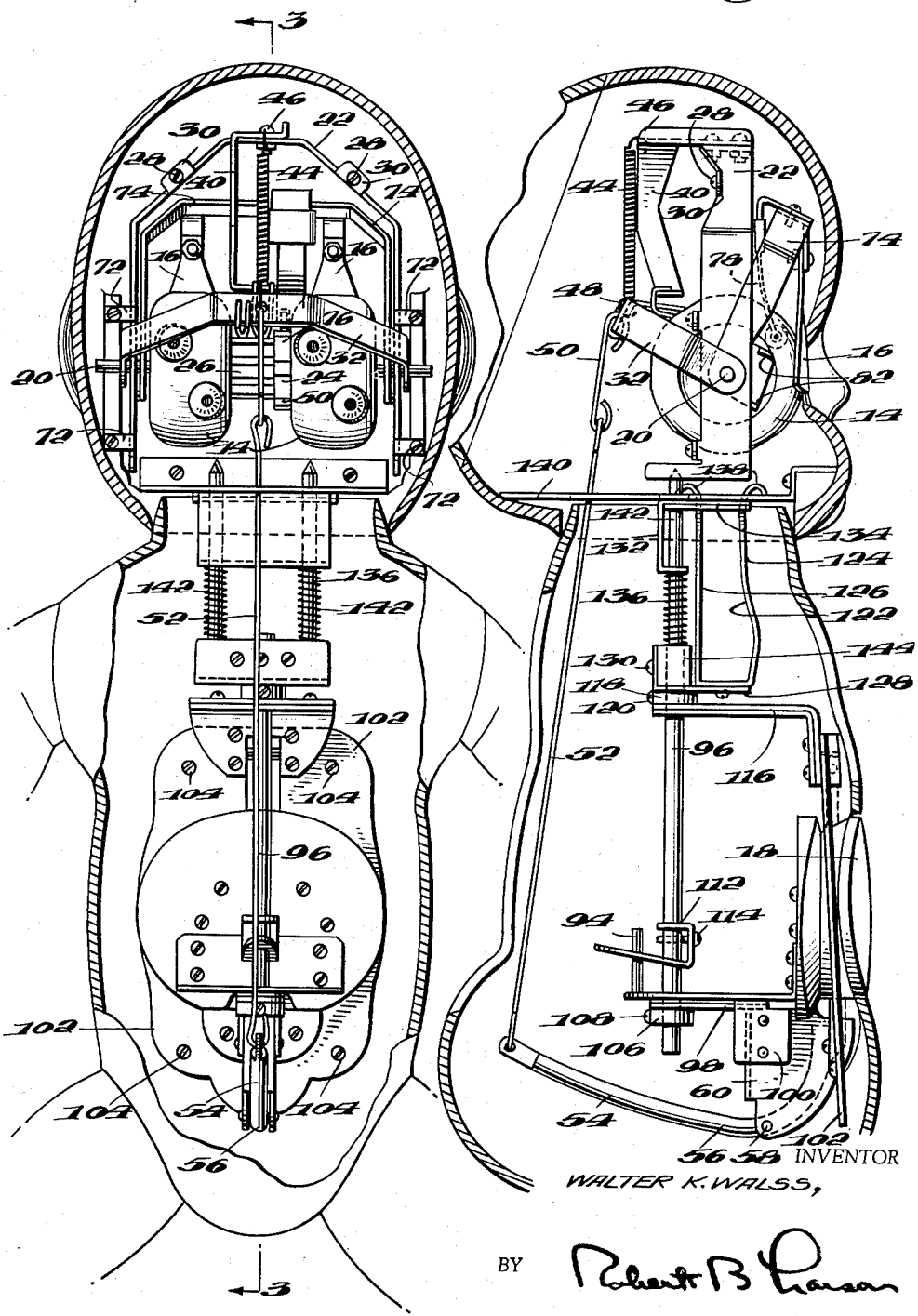

Oct. 4, 1960  W. K. WALSS  2,954,639
DOLL

Filed Feb. 18, 1955  5 Sheets-Sheet 4

INVENTOR
WALTER K. WALSS,
BY Robert B. Pearson
ATTORNEY

Oct. 4, 1960        W. K. WALSS        2,954,639
DOLL
Filed Feb. 18, 1955        5 Sheets-Sheet 5
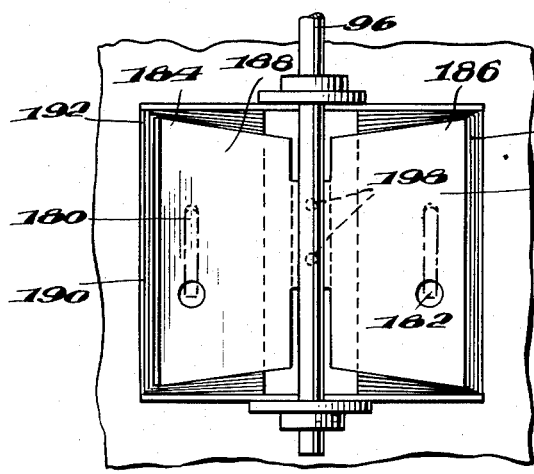
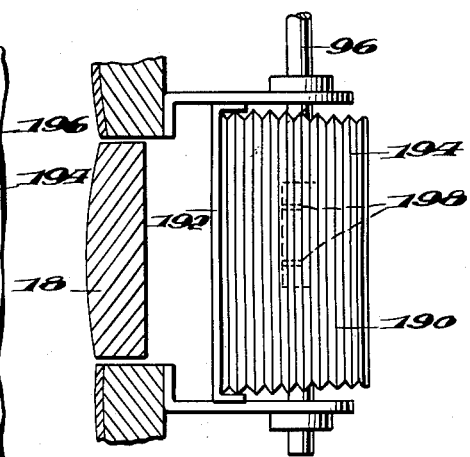
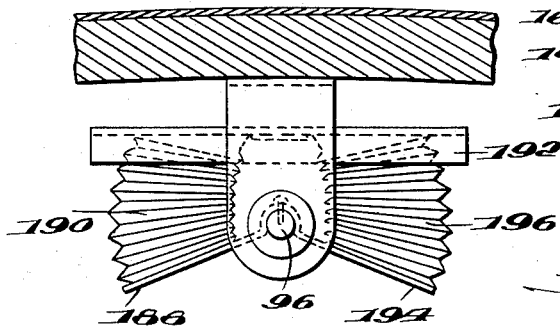
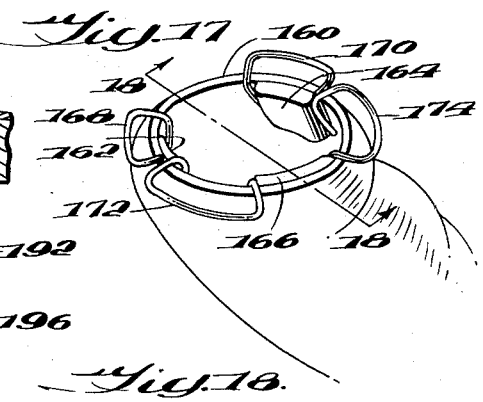
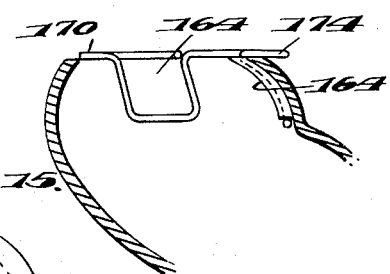
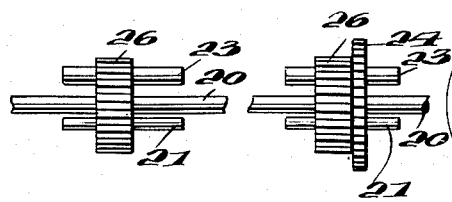
INVENTOR
WALTER K. WALSS
Robert B Pearson
ATTORNEY United States Patent Office 2,954,639
Patented Oct. 4, 1960

2,954,639
DOLL

Walter K. Walss, New York, N.Y.
(Kelly Corners, Delaware County, N.Y.)

Filed Feb. 18, 1955, Ser. No. 489,064

5 Claims. (Cl. 46—120)

This invention relates to mechanical figures such as dolls, manikins and the like and particularly to such figures having rotating heads and rotating eye balls.

In the prior art there have been invented dolls having rotating eye balls including my own invention covered in Patent No. 2,670,568. There have also been invented dolls with rotatable heads. However, in certain of the prior art dolls, the eye rotating mechanisms did not provide a realistic appearing doll. The movements and appearance were not true to life. The head rotating mechanisms were limited in their actions so that the head rotation could not be cleverly performed or the head could not be rotated to either side of the normal straight ahead position and permitted to remain at either side of this position.

Further, it has not been possible heretofore to combine in a single doll the rotating head and rotating eye balls through the operation of only a single push button.

My invention eliminates many of the inadequacies of the prior art dolls. My doll is provided with a head having rotating eye balls with a plurality of different irises around the circumference of the eye balls. The rotation of the eye balls cooperates with pivoted eye lids so that the changing of the irises is concealed. The rotation of the eye balls is caused by the movement of a push button mounted on the body of the doll. It is possible according to the invention to have a complete change of irises through one operation of the push button or through two operations of the push button depending upon the design of the rotating mechanism.

Cooperating with the eye-rotating mechanism is an arrangement for rotating the head of the doll. It is possible to rotate the head of the doll through the operation of the same push button which operates the rotation of the eye balls.

I have further provided in my invention a novel arrangement for attaching the head of the doll to the rotating mechanism in the doll body. Through this attaching arrangement it is possible to assemble the eye ball rotating mechanism in the head completely independently of the assembly of the mechanism in the body of the doll. When both have been assembled, the head can be joined to the doll body merely by snapping it on to the body and making a simple connection of the linkage between the doll body mechanism and the eye rotating mechanism.

It is an object of the invention, therefore, to provide a doll having realistically changing irises. It is another object of the invention to provide a doll which can have an iris change merely by a quick blink of the eye lids and, further, a doll in which the eye lids can be maintained closed.

It is a further object of the invention to provide a doll with a novel head rotating mechanism by which the head can be rotated to either side of its normal position and maintained at any position to which it is rotated.

It is still another object of the invention to provide a doll having an eye rotating mechanism and a head rotating mechanism both of which are operated from a single push button on the doll body.

It is yet another object of the invention to provide a novel arrangement for attaching the head of the doll to the doll rotating mechanism in the body of the doll.

These and other objects will become more readily apparent from a consideration of the structural details of the invention as set forth in the following description and as shown in the accompanying drawings in which:

Fig. 1 is a perspective view of a doll showing a part of my invention,

Fig. 2 is a perspective view of the operating mechanism of the doll, removed from the doll body, Fig. 3 is a sectional view taken along lines 3—3 of Fig. 5, Fig. 4 is a sectional view with the mechanism of the doll in side elevation, Fig. 5 is a sectional view with the mechanism of the doll in rear elevation, Fig. 6 is a sectional view taken along lines 6—6 of Fig. 3, Fig. 7 is a sectional view taken along lines 7—7 of Fig. 3, Fig. 8 is a sectional view taken along lines 8—8 of Fig. 3, Figs. 9–12 are fragmentary views of the eye rotating mechanism, Figs. 13–15 are fragmentary views showing the eyeball and gear assembly, Fig. 16 is a diagrammatic view showing the operation of the head rotating mechanism, Fig. 17 is a perspective view of a limb attaching device, Fig. 18 is a cross sectional view taken along lines 18—18 of Fig. 17, Fig. 19 is a rear elevational view of the voice simulator, Fig. 20 is a perspective view of the voice simulator, and Fig. 21 is a top plan view of the voice simulator.

Fig. 1 shows the outward appearance of a doll having a head 10 and a body 12. The head has rotatable eyeballs 14 and pivotal eyelids 16 which are operated by the mechanism to be described below. The head is rotatably mounted to the body and the operation of the rotating eyeballs and the head rotation is caused by movement of a push button 18.

Eyeball rotating mechanism

The eyeball rotating mechanism is best shown in Figs. 2, 3 and 9. Eyeballs 14 are fixedly mounted to a shaft 20 which is journaled in a U-shaped frame 22. Fixed to the shaft 20 and located between the eyeballs 14 are a cam 24 and a ratchet wheel 26. The U-shaped frame is mounted to the head of the doll by means of screws 28 connecting tabs 30 to the doll head.

The eye unit, consisting of the eyeballs 14, ratchet wheel 26 and cam 24 could be molded in one integral piece of hard plastic material. If, on the other hand, the eyeballs, ratchet wheel and cam are made separately and subsequently assembled, precautions are necessary to assure that the members are assembled with the precise correct relationship to each other. Figs. 13–15 show an arrangement which will be satisfactory and which will guarantee that the parts are always assembled in the same manner.

Mounted fast to ratchet wheel 26 are the shaft 20 and two pins 21 and 23. The pins are located 120° from each other and pin 21 is slightly smaller than pin 23. For example, the pins can be ¾₂″ and ⅘₂″ respectively.

Three holes 20′, 21′ and 23′ are formed in the eyeballs and cam of the exact size just to receive the shaft 20 and pins 21 and 23. With the parts designed as described, correct orientation upon assembly is always assured.

The eyeballs are rotated by a U-shaped arm 32 which is pivotedly mounted to shaft 20 and carries a pawl 34.

Ratchet wheel 26 has teeth 36 which are engaged by the pawl 34 and the ratchet wheel 26 is rotated by the pivotal movement of the U-shaped arm 32.

In order to prevent reverse rotation of ratchet wheel 26 and, consequently, the eyeballs 14, a stop pawl 38 also engages the ratchet wheel 26 and is fixedly mounted to the frame 22 by means of an arm 40 which is bolted at 42 to the frame 22.

The U-shaped arm 32 is biased upwardly by spring 44 which is connected to the arm 40 at 46 and to the U-shaped member at 48. A short link 50 is also connected to the U-shaped arm 32.

A long link 52 connects short link 50 to the longer arm 54 of a bell crank lever 56 which is pivoted at 58 to a frame member 60 which is fixedly mounted to a plate 102. The plate 102 is fastened to the doll body 12 in one of the final assembling operations. The bell crank lever 56 is rotated through the engagement of an abutment 62 which is journaled in the push button 18. The abutment 62 is a part of a rod 64 which is pivoted at its other end at 66 to the doll body 12.

The arrangement is such that inward movement of the lower part of the push button 18 causes the rod 64 to pivot about point 66 so that the abutment 62 engages bell crank lever 56 to cause its rotation about its pivot point 58. To maintain abutment 62 in engagement with the shorter arm of the bell crank lever, the frame 60 is U-shaped shown in Fig. 2 and Fig. 8.

Counterclockwise rotation of the bell crank lever 56 causes a counterclockwise rotation of U-shaped arm 32 until the U-shaped arm 32 attains the position shown in the dotted lines in Fig. 9. When the push button is released, spring 44 pulls the arm 32 clockwise back to normal position, and during this movement the pawl 34 rotates the ratchet wheel 26 through the arc of one tooth.

The frame 22 is provided with stops 72 which limit the rotation of the arm 32 through an arc equal to 60°. Consequently, the pawl 34 is limited in its movement to the same arc.

In the embodiment shown, each eyeball has six irises located approximately 60° from each other. The cam and ratchet wheel arrangement is based on the use of six irises. A greater or lesser number could be used and the cam and ratchet wheel arrangement would be changed accordingly.

It will be observed from Figs. 9–12 that the ratchet wheel has two sizes of teeth. The larger tooth indicated at 68 covers an arc slightly less than 60° corresponding to the arc between the two irises rotated when the pawl 34 engages a tooth 68. Accordingly, the rotation of the ratchet wheel through an arc of the larger tooth 68 causes a complete change of irises.

There are also smaller teeth 70 and 71 approximately half the size of teeth 68 which together cover an arc slightly greater than 60°. The pitch between irises corresponding to teeth 70 and 71 is also slightly greater than 60°.

By this arrangement, when the pawl 34 moves over a large tooth 68 and is returned under the action of spring 44, a complete change of irises occurs. On the other hand, when the pawl 34 moves over one of the teeth 70, it is restrained by stop 72 from moving completely over the second tooth 70 since the two teeth 70 cover an arc slightly greater than the arc through which pawl 34 is permitted to move. On the return stroke, the pawl 34 will lodge in the valley between the two teeth 70 and move the eyeball through approximately one-half the arc between irises. Actuation of the mechanism a second time causes pawl 34 to lodge against the last tooth 70 and, on the return stroke, complete the rotation of the eyeball so that a complete change of irises occurs.

The movements described above cooperate with the eyelid movements to be described below, whereby the eyelids of the doll are closed during rotation of the eyeball, and in certain instances can remain closed even though pressure on the push button is released.

Figs. 4 and 9–12 show best the attachment of the eyelid to the rest of the mechanism and the cooperation with the ratchet wheel and cam. The eyelid 16 is connected to a U-shaped arm 74 which is rotatably mounted on a shaft 20. A roller 76 is also connected to the U-shaped arm 74 by means of a piece of spring steel 78 which urges the roller tightly against the cam 24. Cam 24 is provided with projections 80 equal in number to the number of irises and spaced from each other by an angle equal to the arc between adjacent irises.

The arm 74 is also provided with stops 82 (Fig. 4) which engage the frame member 22 to restrict the rotation of arm 74 to an angle equal to approximately one-half the angle between irises and between projections 80 on the cam 24. This is just sufficient distance for opening and closing the eyelid completely.

It can be seen from Figs. 9–12 that rotation of the cam in a counterclockwise direction (caused by the rotation of the ratchet wheel 26) will force the roller and consequently the eyelids also to move in a counterclockwise direction closing the eyelid of the doll. If the cam moves through an angle equal to approximately one-half the angle between projections 80, the eyelid will remain closed. This occurs when the pawl 34 engages the smaller sized teeth 70 as described above. Rotation of the cam 24 through the remaining portion of the angle will cause the roller, which is blocked from further counterclockwise movement by stops 82, to rise up over the projection 80 and under the spring action of member 78 force the eyelids to return to their open position.

On the other hand, if the cam 24 rotates through a complete angle between projections, the eyelids will close and remain closed for substantially the complete arc of rotation and then snap open during the last few degrees of rotation. By this arrangement, the eyelid remains closed while the eyeball rotates shifting from one iris to the next adjacent iris and then snaps open when the change has been substantially completed. Thus, no unnatural rotation of the eyeball is seen by the observer.

Inspection of Figs. 9–12 will show that four of the cam teeth are of equal size covering an arc slightly less than 60° thereby corresponding in size to the ratchet wheel teeth 68. The two remaining cam teeth 80 are elongated by the addition of a plateau portion 81 thereby corresponding in size to the two teeth 70. The additional surface provided by portion 81 is necessary to prevent the eyelids from opening before a complete change of irises has been effected.

The fact that ratchet wheel teeth 70 must cover an arc slightly greater than 60° means that the pawl 34 will move the eyeball through an arc greater than 60° upon engagement of first and second teeth 70. The eyelid 16 is arranged to close and open after the normal sized tooth 68 has been rotated 60°. If it opened after 60° when the pawl has engaged teeth 70, it would show the eyeball moving through the last part of its arc and would be unnatural.

To avoid this unnatural action the cam teeth corresponding to ratchet teeth 70 are made larger by the portion 81. Now, after rotation of the eyeball through 60°, the roller 76 does not ride completely over the tooth shoulder to open the eyelid. Rather, the roller rides onto the plateau formed by position 81, and continues to ride on the plateau until the eyeball has reached the end of its rotation and the iris change is completed. At this point the roller completes its ride over the cam tooth and the eyelid is caused to open.

It should be noted that the plateau is provided with a slight downward slope. When the eyelid is in its closed position (Fig. 11) and a child attempts to force the eyelid open by pushing on the eyelids, the slope on the plateau will always urge the eyelids toward closed position. Upper eyelid stop 82 is important in this regard.

It prevents the child from rotating the eyelid roller 76 clear over the plateau portion 81 and into the back of the head. Thus, when forced open, the roller must always stop on the inclined plateau and consequently, the eyelid will always return to normal position.

With the eyeball mechanism arranged as described herein, eight operations of the push button cause a complete cycle of operations. Since the two half cycles are identical the operation will be explained with respect to only four push button operations. These operations are shown in Figs. 9–12, in sequence.

Fig. 9—*The first operation.*—Closes the eyes fully and reopens them within a split second, thus simulating blinking of the eyelids and thereby having effected a concealed change of iris pairs.

Figure 10:
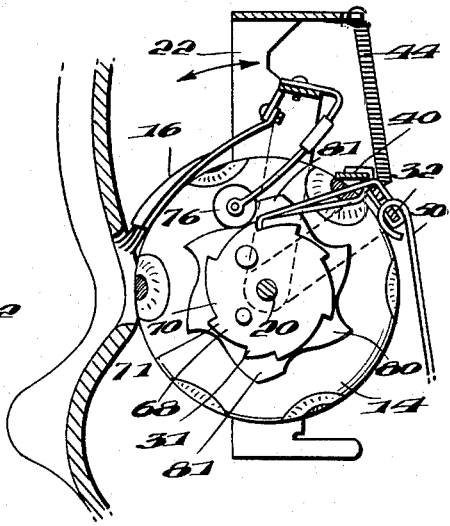

Fig. 10—*The second operation.*—Also effects a rapid blinking of the eyelids, thereby performing also a concealed change of irises.

Figure 11:
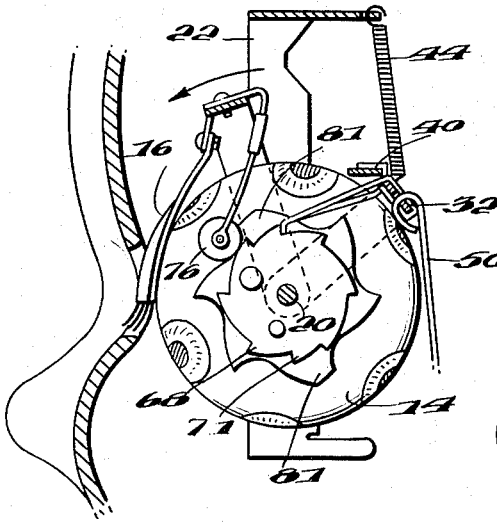

Fig. 11—*The third operation.*—Closes the eyelids, which remain so closed until the next operation is undertaken. (A doll must also be able to "sleep.")

Figure 12:
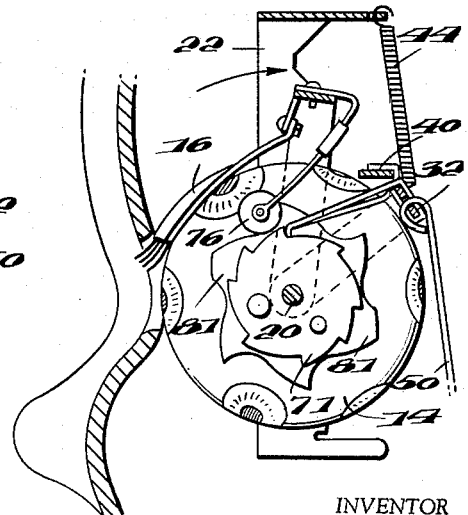

Fig. 12—*The fourth operation.*—Opens the eyelids and shows that a concealed change of iris pairs had taken place.

Head rotating mechanism

Attached to the push button 18 is an arm 90 having a hole 92 in a large portion of the arm and having a pin 94 attached to the farthest extremity of the arm. A spindle 96 extends through the hole 92 and is journaled at the lower end in a plate 98 which is fixedly attached to the U-shaped member 60 by means of the flanges 100 depending from the plate. The member 60 is fixed to the doll body by means of the plate 102 which is attached to the doll body by screws 104. A collar 106 is affixed to the lower end of the spindle by a set screw 108 and prevents the spindle from moving upwardly out of the plate 98.

The pin 94 extends through a slot 110 in an arm 112 which is affixed to the spindle by a screw 114.

It can be seen that the rotation of the push button 18 about the rod 64 causes a pivoting movement to be imparted to arm 90. The pin 94 swings in an arc and, because of its engagement with the arm 112 causes the rotation of spindle 96. The use of the elongated slot 110 and the large hole 92 in the arm 90 permits the push button 18 to be pushed into the body of the doll to cause the rotation of the eyeballs while not interfering with the rotary movement of the push button 18 about the rod 64 which causes the rotation of spindle 96.

The pin 94 and slot 110 arrangement is positioned on the side of the spindle 96 remote from the push button 18 in order to provide a longer turning arc for the head and better mechanical advantage, thereby keeping to a minimum the force required to rotate the head of the doll.

This action is best shown in Fig. 16 which compares, diagrammatically, the action for the linkage according to the invention, to the action of linkage arranged the opposite of that of the invention.

Pressure on the left side of push button 18 causes the doll head to rotate through arc A. (Note that the doll head turns toward the same side on which the button is pushed. This is important since the doll is designed for small children who would naturally push the side toward which the head is to turn.)

If the slot and pin were arranged as at 111 and 95, a push on the left side of button 18 would rotate the head through the arc B which is considerably smaller than A. (Not that the head turns toward the side opposite that on which the button was pushed.)

It can also be seen from Fig. 16 that a longer lever arm is provided by arranging the linkage according to the invention.

The upper end of the spindle 96 passes through a plate 116 which is also fixed to the doll body through fixed plate 102. A collar 118 attached by a set screw 120 prevents the spindle from slipping downwardly out of plate 116.

A U-shaped member 122 forming two spring clips 124 and 126 is fixed to the spindle 96 by means of the L-shaped member 128 which is fastened to the spindle by a screw 130. A J-shaped member 132 forming a plate 134 at the longer leg thereof is slipped onto spindle 96 and maintained in the position shown in the drawings by springs 136. The spring clips 124 and 126 are bent at their extremities 138.

At the neck portion of the head 10 is fixed a plate 140. When the head is set in the position shown in the drawings, the plate 140 is clamped between the bent portions 138 of the spring clips and the plate 134. The clamping action is effected by the springs 136. A pin 142 is threaded through each spring 136 and is fixed to the spindle 96 by a block 144 which is fastened to the L-shaped member 128. The pins project up through the J-shaped member 132 and through holes in the plate 140. The pins 142 not only serve to support the springs 136 but also maintain the head in proper alignment.

The doll head can be attached and removed simply first by releasing a long length 52 from short length 50 and by squeezing together the spring clips 124 and 126. This every simple attachment forms a very secure support for the doll's head while providing the obvious advantages to the manufacture of the doll in that the mechanism in the body portion of the doll can be assembled separately from the eyeball rotating mechanism in the head of the doll and the two sections can thereafter be snapped together within seconds.

Another important advantage of the head attachment is that it prevents the head's being pulled away from the doll shoulders. This is important in order to have a natural appearing doll, but also the distance between lever 32 and crank arm 54 must not vary, or the eye rotating mechanism will function improperly. To maintain that unvarying relationship the head must be prevented from moving away from the shoulders of the doll.

Another manner of attaching the head to the shoulders is shown in Fig. 17. This arrnagement is suitable primarily where only the eyeball rotating mechanism is used and no head rotation is contemplated. The attachment in addition to being desirable for the head, is also excellent for the attachment of the limbs of the doll to the doll body.

Fig. 17 is a view looking down into the neck of the doll from which the head has been removed. The appearance would be the same if one were looking into the limb of the doll having such a joint.

The neck is indicated by numeral 160 and is formed with two protrusions 162 and 164 at the back of the neck and a third protrusion 166 at the front of the neck just under the chin. A single piece of wire which is fairly rigid while having resilient characteristics (such as in a heavy paper clip) is wrapped around the protrusions in the manner shown to form two small loops 168 and 170 at the back of the neck and two large loops 172 and 174 at the front of the neck. Thes loops are spring biased outwardly by the elastic characteristics of the metal in the wire.

The head is set in place on the doll simply by slipping the chin of the doll under the front loops 172 and 174 and then forcing the head over the back loops 168 and 170. The back loops will be forced inwardly by the forceable engagement with the marginal portions of the head opening and will then snap outwardly into the position shown in Fig. 18 after the head is set into place.

Voice simulator

Another feature of the invention is shown in Figs. 19, 20 and 21. This is a voice simulator which is operable by the push button 18. The voice simulator has been shown removed from the other doll structure so that it can be presented with greater clarity.

The voice simulation comes from a windpipe 180 and a second windpipe 182 having a higher pitch than windpipe 180. The windpipes are attached to and operated by bellows 184 and 186 respectively. Bellows 184 consists of a moveable wall 188 connected by a collapsible diaphragm 190 to a fixed wall 192. Similarly, bellows 186 has a moveable wall 194, a diaphragm 196 and can be attached to the same fixed wall 192. The moveable walls are both fixed by pins 198 to the rotatable spindle 96. The manner in which the spindle is rotated has already been described above.

The operation of the voice simulator is as follows. Upon depressing the push button 18 on the left side, the wall 188 is rotated toward the fixed wall 192 squeezing the bellows 184 to force air through the windpipe 180 creating a sound similar to that of a child. During the same movement, the wall 194 is moving away from the fixed wall 192 drawing air into the bellows 186 without creating any sound.

When the push button is pushed on the right side, the reverse action takes place so that air is forced through the windpipe 182 creating a noise of slightly higher pitch.

If the push button is depressed rapidly to the left and to the right, the windpipes 180 and 182 give off sounds in rapid succession thus simulating an imitation of mumbling or of the laugh of a child.

Operation

Much of the operation of the doll has already been described in connection with the description of the structure. From the standpoint of a child operating the doll, the operation is quite simple. The child only has to operate push button 18. If the thumb is pushed against the lower portion of the push button 18 and pushed inwardly, the eyeballs of the doll will be rotated upon release of the push button, although the rotation will be concealed by the eyelids 16. At times one push and release on the push button 18 will cause a blinking of the eyelid with a complete change of the irises. At other times, one push and release on push button 18 will cause the eyelids to close and the doll can remain in a sleeping attitude irrespective of the position of the doll. Another push and release on the push button will cause the eyelids to snap open and the doll will appear to be awake.

By pushing on either side of the push button 18, the doll will turn its head from side to side. Thus, the doll can be made to shake its head as if in answer to a question or the doll can turn its head to one side or the other and have it remain in that position as if listening to the conversation of one sitting to the doll's side. If the voice simulator is employed, the doll voice will sound simultaneously with the head rotation.

Further, while the doll's head is turned, the irises can be changed by pushing on the lower portion of push button 18 as described above.

Thus, the mechanism according to the invention gives the doll a very simple mode of operation, as far as the child operating the doll is concerned while at the same time providing more realism in a doll than has been known in any of the prior art dolls.

In a general manner while I have in the above description disclosed what I deem to be the most practical and efficient embodiments of my invention, it should be well understood that I do not wish to be limited thereto as there might be changes made in the arrangement, disposition and form of the parts without departing from the principle of the present invention as comprehended within the scope of the accompanying claims.

I claim:

1. In a figure, a hollow body, a head rotatably mounted on said body, rotatable eyeballs mounted in said head and each having a plurality of irises around the circumference thereof, linkage extending from said eyeballs into said body for rotation of said eyeballs upon longitudinal reciprocation of said linkage, an arm pivotally connected to said body and connected at one end to said linkage, a single push button engaging the other end of said arm to pivot said arm to reciprocate said linkage, a spindle connected to said head and extending into said body, and means connecting said single push button to said spindle for rotation of said spindle independently of the rotation of said eyeballs.

2. A figure according to claim 1 in which said last-named means comprises, an arm fixed to said spindle and extending radially outwardly therefrom, said arm having a slot therein, a pin slidable in said slot, a pin carrying member fixed to said push button at one end and having said pin fixed to the other end, and means pivotally mounting said push button whereby pivoting of said button causes rotation of said head.

3. A figure according to claim 2 in which said pivotal mounting of said push button is on the side of said spindle remote from said slotted arm.

4. A figure according to claim 1 in which said push button has a transverse pivot to permit it to swing into said body for rotation of said eyeballs, and has a further longitudinal pivot to permit it to pivot about a longitudinal axis for rotation of said spindle.

5. A figure according to claim 4, and an abutment mounted on the end of said push button remote from said transverse pivot, said abutment forming the engagement between said push button and said pivotally connected arm.

References Cited in the file of this patent

UNITED STATES PATENTS

| | | |
|---|---|---|
| 1,050,793 | Beedle | Jan. 21, 1913 |
| 1,667,104 | Cesare | Apr. 24, 1928 |
| 1,695,675 | Wilhelm | Dec. 18, 1928 |
| 1,762,374 | Yancey | June 10, 1930 |
| 2,137,371 | Marsh | Nov. 22, 1938 |
| 2,448,668 | Geller | Sept. 7, 1948 |
| 2,653,415 | Becker | Sept. 29, 1953 |
| 2,669,064 | Stewart | Feb. 16, 1954 |
| 2,669,802 | Olivier | Feb. 23, 1954 |
| 2,670,568 | Walss | Mar. 2, 1954 |
| 2,689,431 | Beebe | Sept. 21, 1954 |
| 2,701,933 | Pearson | Feb. 15, 1955 |

FOREIGN PATENTS

| | | |
|---|---|---|
| 119,771 | Great Britain | Oct. 17, 1918 |
| 568,649 | France | Dec. 24, 1923 |